UNITED STATES PATENT OFFICE.

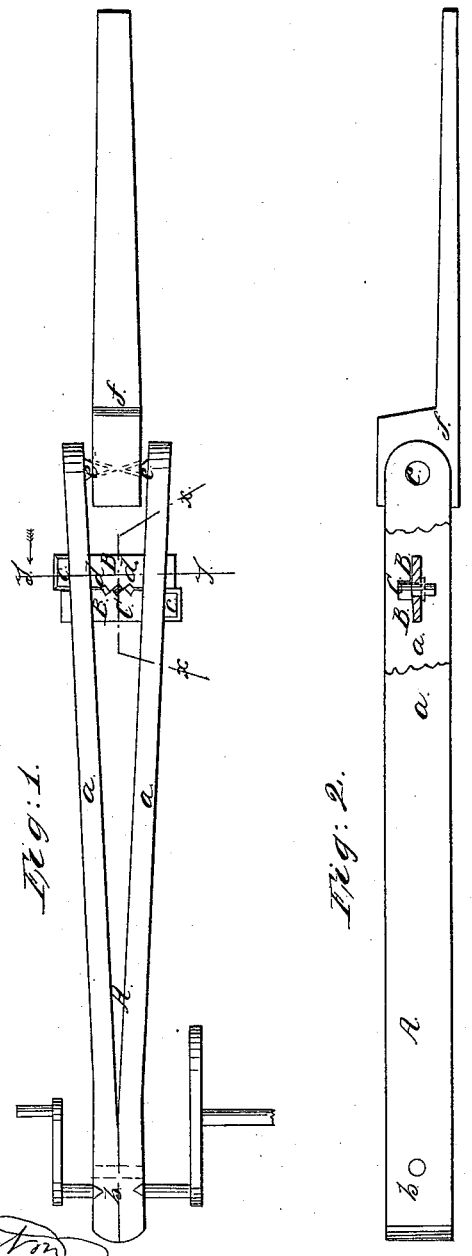

HIRAM BISHOP, OF BATAVIA, IOWA.

IMPROVEMENT IN PITMAN-COUPLINGS FOR HARVESTERS.

Specification forming part of Letters Patent No. 53,261, dated March 20, 1866.

*To all whom it may concern:*

Be it known that I, HIRAM BISHOP, of Batavia, in the county of Jefferson and State of Iowa, have invented a new and Improved Pitman-Coupling for the Sickles of Grain and Grass Harvesters; and I do hereby declare that the following is a full, clear, and exact description thereof, which will enable others skilled in the art to make and use the same, reference being had to the accompanying drawings, forming part of this specification, in which—

Figure 1 is a plan or top view of my invention. Fig. 2 is a side view of my invention, partly in section, as indicated by the line $x\,x$, Fig. 1; Fig. 3, a transverse section of the same, taken in the line $y\,y$, Fig. 1.

Similar letters of reference indicate like parts.

This invention relates to a new and improved mode of connecting the pitman to the sickle of a grain and grass harvester, as hereinafter fully shown and described, whereby the pitman-connection may always be kept tight and firm, all looseness and unnecessary wear avoided, and the connection tightened whenever necessary, and the pitman prevented from becoming casually detached or liable to break.

A represents the pitman, which is composed of two longitudinal parts, $a\,a$, connected together at one end, as shown at $b$, where it is fitted on the crank of the driving-shaft, as shown in red in Fig. 2.

The two parts $a\,a$ of the pitman may be spread more or less apart, and they are adjusted in this direction and held at a greater or less distance apart by means of two keys, B B, which pass through said parts side by side, and have heads $c$ at one end, said keys passing through the pitman from opposite sides, as shown clearly in Fig. 2.

The sides or edges of the keys B B which are in contact with each other are notched, as shown at $d$, said notches being of V form or angular, that would probably be the most desirable shape, and these notches, of which there are several in each key, secure a pin, C, the latter being driven down through two of the notches $d$, which are in line or register with each other, as will be fully understood by referring to Fig. 2, and it will be seen by referring to this figure that the parts $a\,a$ of the pitman may be secured at a greater or less distance apart by this arrangement and effectually held so as to preclude the possibility of a casual release.

The ends of the parts $a\,a$ are provided at their inner sides with conical pins $e\,e$, which fit in corresponding-shaped holes in the sickle-bar $f$, as shown in Fig. 2, and in case of the pins $e$ or the holes in $f$ wearing so as to render the connection loose the pins, by drawing the parts $a\,a$ nearer together and securing them by the means above described, may be fitted snugly again in the holes, and all rattling and unnecessary wear and tear avoided.

The dispensing with screw-bolts is a great advantage, as they are subjected to great wear, and the nuts frequently work off and are lost, and occasionally are mislaid, causing a great embarrassment.

Having thus described my invention, I claim as new and desire to secure by Letters Patent—

The keys B B and pin C, in combination with the pitman A, composed of two parts, $a\,a$, connected together at one end, and provided at their opposite ends with conical pins $e\,e$ to fit in corresponding-shaped holes in the sickle-bar, substantially as and for the purpose set forth.

The above specification of my invention signed by me.

HIRAM BISHOP.

Witnesses:
JAMES M. MCCLELLAND,
JAMES CAMPBELL.